United States Patent
Cooke et al.

(10) Patent No.: US 7,184,633 B2
(45) Date of Patent: Feb. 27, 2007

(54) PRETERMINATED FIBER OPTIC DISTRIBUTION CABLE

(75) Inventors: Terry L. Cooke, Hickory, NC (US); John B. Johnson, Hickory, NC (US); Dennis M. Knecht, Hickory, NC (US); James P. Luther, Hickory, NC (US); Lars K. Nielsen, Denver, NC (US)

(73) Assignee: Corning Cable Systems LLC

( * ) Notice: Subject to any disclaimer, the term of this patent is extended or adjusted under 35 U.S.C. 154(b) by 181 days.

(21) Appl. No.: 10/724,244

(22) Filed: Nov. 26, 2003

(65) Prior Publication Data

US 2005/0111799 A1   May 26, 2005

(51) Int. Cl.
*G02B 6/44* (2006.01)
(52) U.S. Cl. ..................... 385/100; 385/113
(58) Field of Classification Search ............... 385/100, 385/109, 112, 113
See application file for complete search history.

(56) References Cited

U.S. PATENT DOCUMENTS

| | | | | |
|---|---|---|---|---|
| 4,961,623 A | 10/1990 | Midkiff et al. | ............. | 350/96.2 |
| 5,121,458 A | 6/1992 | Nilsson et al. | ............. | 385/100 |
| 5,125,060 A | 6/1992 | Edmundson | ............... | 385/100 |
| 5,210,812 A | 5/1993 | Nilsson et al. | ............. | 385/100 |
| 5,440,665 A | 8/1995 | Ray et al. | ................... | 385/135 |
| 5,528,718 A | 6/1996 | Ray et al. | ................... | 385/136 |
| 5,617,496 A * | 4/1997 | Kingstone | ................... | 385/100 |
| 6,169,834 B1 * | 1/2001 | Keller | ........................ | 385/101 |
| 6,466,725 B2 | 10/2002 | Battey et al. | ............... | 385/135 |
| 6,619,697 B2 | 9/2003 | Griffioen et al. | ......... | 285/126.1 |
| 6,714,708 B2 * | 3/2004 | McAlpine et al. | .......... | 385/110 |
| 6,748,147 B2 * | 6/2004 | Quinn et al. | ................ | 385/110 |

FOREIGN PATENT DOCUMENTS

| | | |
|---|---|---|
| DE | 3537684 | 4/1987 |
| JP | 62-054204 | 3/1987 |
| JP | 2001116968 | 4/2001 |

* cited by examiner

*Primary Examiner*—Thanh-Tam Le
(74) *Attorney, Agent, or Firm*—Miller & Bernard, PLLC; Christopher C. Dreman

(57) ABSTRACT

A factory-manufactured, preterminated fiber optic distribution cable having at least one predetermined access location for providing access to at least one preterminated optical fiber. A preterminated fiber optic distribution cable comprising at least one buffer tube comprising at least one optical fiber, a buffer tube transition piece operable for transitioning the at least one optical fiber from the at least one buffer tube into at least one protective tube, a C-shaped molded member defining a longitudinally extending optical fiber guide channel operable for storing a length of the at least one preterminated optical fiber and a protective means. A method of mid-span accessing at least one optical fiber from a fiber optic distribution cable. A buffer tube transition piece operable for transitioning a plurality of preterminated optical fibers from a buffer tube into protective tubing.

9 Claims, 8 Drawing Sheets

PRETERMINATED FIBER OPTIC DISTRIBUTION CABLE

BACKGROUND OF THE INVENTION

1. Field of the Invention

The present invention relates generally to a preterminated fiber optic distribution cable and, more particularly, to a fiber optic distribution cable having at least one predetermined access location for providing access to at least one preterminated optical fiber.

2. Description of the Related Art

Optical fibers are used for a variety of applications including voice communication, data transmission and the like. With the ever-increasing need for connecting remote locations to a fiber optic distribution cable, it is apparent that more efficient methods of performing a mid-span access of a distribution cable are required. Typically, to perform a mid-span access, a technician must remove a portion of the cable sheath in the field at a convenient location along an installed distribution cable. Once the sheath is removed, the technician must access pre-selected optical fibers, sever the pre-selected optical fibers and remove a length of the optical fibers from the distribution cable. The removed length of optical fiber provides the field technician with adequate length to splice one or more optical fibers of a cable comprising a lesser amount of optical fibers than the distribution cable, typically termed a "drop cable," to the distribution cable optical fibers. After all splicing is complete, the accessed location is typically covered using an enclosure designed to protect the splices and the exposed section of the distribution cable. This time consuming process is typically accomplished by a highly skilled field technician at a significant cost and under less than ideal working conditions.

Several approaches have been developed to overcome the disadvantages of accessing optical fibers in the field. In one approach, the splicing of drop cables to the distribution cable is performed at a factory during the manufacturing of the cable. The preterminated cable, including the main cable, drop cables and associated splice closures, are assembled and wound onto a cable reel to be delivered to an installation site. Accordingly, conditions for making high quality splices may be maximized in the factory, thereby increasing splice quality and also reducing the expense and difficulty associated with field splicing.

In one approach, U.S. Pat. No. 5,121,458 (the '458 patent) issued to Nilsson et al. and entitled "Preterminated Fiber Optic Cable," describes a preterminated optical fiber cable having a main trunk cable comprising a plurality of optical fibers disposed therein, and multiple drop cables spliced to the trunk cable at various branch points. The preterminated fiber optic cable is completely assembled at the time of manufacture and is easily installed thereafter. At each branch point, a splice closure is utilized for protecting the optical fibers and splices from moisture and mechanical damage, providing a strong anchoring point for the optical fiber drop cable and insuring that the minimum fiber bend radius is not violated. While the preterminated fiber optic cable assembly described in the '458 patent is useful in certain applications, its use is limited to applications in which it is installed through a conduit having an outer diameter of about 4 inches or greater. In addition, the relatively large outer diameter of the splice closure may greatly hamper the winding of the assembled cable onto a cable reel. The large diameter of the splice closure may prevent installation of the cable within a section of buried conduit, which typically has a diameter of less than about 1.9 inches, and in some applications less than about 1.25 inches. For example, conduits having a diameter of less than about 1.25 inches are commonly used for placing fiber optic cable under obstructions, such as driveways.

In another approach, U.S. Pat. No. 5,528,718 (the '718 patent) issued to Ray et al. and entitled "Fiber Optic Cable System Including Main and Drop Cables and Associated Fabrication Method," describes an approach to overcome the difficulties in reducing the size of the branching point of the drop cables from the main cable. The cable system is assembled in the factory and includes a main cable and one or more drop cables connected to the main cable at spaced apart locations along the main cable. The drop cable is spliced to the main cable using a splice closure including a fiber guide that secures spliced together end portions of the respective optical fibers in a longitudinally extending direction and devoid of any slack coils of optical fiber. Accordingly, the overall diameter of the splice closure is reduced in size as compared to the system of the '458 patent, thereby permitting the cable system to be stored on a reel and to be readily placed within relatively small diameter conduits. The '718 patent describes applications in which the fiber optic cable system may be employed in conduits having a diameter of about 1.8 inches. While the outer diameter of the '718 fiber optic cable system represents a decrease in size compared to the '458 preterminated fiber optic cable diameter, it is still desirable to produce a cable system having a diameter less than about 1.25 inches.

Accordingly, it would be desirable to produce a preterminated fiber optic distribution cable having one or more predetermined access locations with factory preterminated optical fibers along a length of the distribution cable, while achieving the lowest profile possible and still maintaining discrete fiber capability. It would also be desirable to provide a preterminated fiber optic distribution cable having one or more low profile access locations suited for both buried and aerial installations. With regard to buried installations, it would be desirable to be able to pull the distribution cable through a conduit having a diameter less than about 1.9 inches, and more preferably, less than about 1.25 inches, such as a bore or conduit underneath a driveway.

BRIEF SUMMARY OF THE INVENTION

To achieve the foregoing and other objects, and in accordance with the purposes of the invention as embodied and broadly described herein, the present invention provides various embodiments of a factory-manufactured preterminated fiber optic distribution cable having at least one predetermined access location for providing access to at least one preterminated optical fiber. The factory preterminated distribution cable may be wound upon a cable reel and installed within a conduit system having a diameter of less than about 1.25 inches. The primary advantage of this preterminated distribution cable over conventional cable systems is its small outer diameter, which lends itself to installation flexibility. Each access location has an outer diameter of less than 1.9 inches, and more preferably, less than about 1.25 inches, and presents at least one optical fiber for splicing a drop cable to the distribution cable after installation. A second advantage of the present invention is the ability to use a variety of closure designs to protect the splices and to anchor the drop cables.

In one embodiment, the preterminated distribution cable comprises any fiber optic cable having at least one optical fiber disposed within a buffer tube. In order to achieve a low profile mid-span access in the factory, a section of the cable sheath is removed to expose the at least one buffer tube within the distribution cable. Adjacent to the removed section, the cable sheath may be slit and flared back to expose an additional length of the buffer tube. For each access location, the appropriate buffer tube may be accessed in at least two, and preferably three, places using a fiber access tool. Starting at the appropriate buffer tube access point, pre-selected optical fibers are accessed and severed. The remaining optical fibers remain intact and continue through the distribution cable. The pre-selected optical fibers may then be fished out of a second access point in the buffer tube, exposing a length of fiber. If necessary, the same optical fibers may then be fished out of the buffer tube a second time at a third access point, exposing a longer length of fiber.

The exposed optical fiber length may then be routed through a transition piece and fed into one or more protective tubes secured to the transition piece. The transition piece may be secured to a structural member of the cable or to the buffer tube from which the optical fibers were removed at the location where the optical fibers exit the buffer tube. The transition piece is secured for anti-torque and may seal the optical fiber exit point. The one or two exposed access locations remaining on the buffer tube may also be sealed. The slit and flared cable sheath may be repositioned and covered using a heat shrinkable material, or with a self-fusing or elf-amalgamating tape. To protect the exposed region of cable sheath and provide an optical fiber guide channel, the protective tubes may be routed in a channel of a C-shaped molded member positioned and secured over the access location. A heat shrinkable material may be positioned over the access location with at least one ripcord disposed underneath. Once the distribution cable is installed, the at least one ripcord may be used to remove the outer layer of heat shrinkable material to expose the C-shaped molded member. The C-shaped molded member may then be removed and the optical fibers presented for splicing.

In another embodiment, the present invention provides a preterminated fiber optic distribution cable having at least one predetermined access location for providing access to at least one preterminated optical fiber. The distribution cable comprises at least one buffer tube comprising at least one optical fiber, a buffer tube transition piece operable for transitioning the at least one optical fiber from the at least one buffer tube into at least one protective tube, a C-shaped molded member defining a longitudinally extending optical fiber guide channel operable for storing a length of the at least one preterminated optical fiber, and a protective means operable for protecting the at least one buffer tube, the buffer tube transition piece and the C-shaped molded member during installation of the preterminated fiber optic distribution cable. The preterminated distribution cable comprises an outer diameter less than 1.9 inches, and more preferably, less than about 1.25 inches. The preterminated distribution cable, the at least one buffer tube, the buffer tube transition piece and the C-shaped molded member are all sufficiently flexible to permit installation of the distribution cable through a conduit.

In a further embodiment, the present invention provides a method of mid-span accessing at least one optical fiber from a fiber optic distribution cable at a predetermined access location. The method comprises: (1) removing a predetermined length of a cable sheath to expose a predetermined length of at least one buffer tube; (2) cutting one or more longitudinally extending slits into the cable sheath beginning at the downstream end of the exposed predetermined length of the at least one buffer tube; (3) flaring the cut cable sheath to expose an additional length of the at least one buffer tube; (4) cutting at least a first and a second access point on an appropriate buffer tube along the buffer tube length about 10 to about 15 inches apart from one another; (5) severing at least one optical fiber at the first access point to produce at least one preterminated optical fiber; and (6) fishing the at least one preterminated optical fiber out of the second access point to withdraw a first length of the preterminated optical fiber. The method may further comprise: (7) fishing the at least one preterminated optical fiber out of a third access point to withdraw a second longer length of the preterminated optical fiber.

In a still further embodiment, the method further comprises repairing the flared and cut cable sheath using a heat shrinkable material or using a self-fusing or self-amalgamating tape, transitioning the at least one preterminated optical fiber out of the appropriate buffer tube and into at least one protective tube via a buffer tube transition piece, maintaining the at least one preterminated optical fiber in a C-shaped molded member comprising a longitudinally extending optical fiber guide channel, and protecting and sealing the mid-span access with a heat shrinkable material.

In a still further embodiment, the present invention provides a buffer tube transition piece operable for transitioning one or more preterminated optical fibers from a buffer tube into protective tubing. The buffer tube transition piece comprises an optical fiber opening for receiving the preterminated optical fibers exiting from a pre-selected buffer tube, a cavity for routing the preterminated optical fibers into at least one optical fiber slot, and a C-shaped channel for receiving the pre-selected buffer tube, wherein the optical fiber slot is operable for maintaining the preterminated optical fibers and securing the protective tubing.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The preterminated fiber optic distribution cable of the present invention comprises at least one predetermined access location along the cable length for providing access to at least one preterminated optical fiber. In preferred embodiments, the preterminated cable comprises a plurality of access locations at spaced apart locations along the cable length, thus providing multiple access locations, or tap points, for joining at least one drop cable to the distribution cable in the field. The preterminated fiber optic distribution cable may be wound upon a reel for distribution and deployment in aerial and buried applications, such as within a bore or conduit. The preterminated cable system is manufactured in a factory, thus eliminating the need for first installing a fiber optic cable and then performing a mid-span access, for example at a pole or pedestal in the field. The preterminated cable of the present invention offers communication providers factory prepared, low profile access locations that are protected during the cable installation process and are removable once the cable is installed. Once installed, the at least one preterminated optical fiber may be quickly coupled to a drop cable or pigtail via a fusion or mechanical splice, and mated to any desired closure type.

Figure 1:
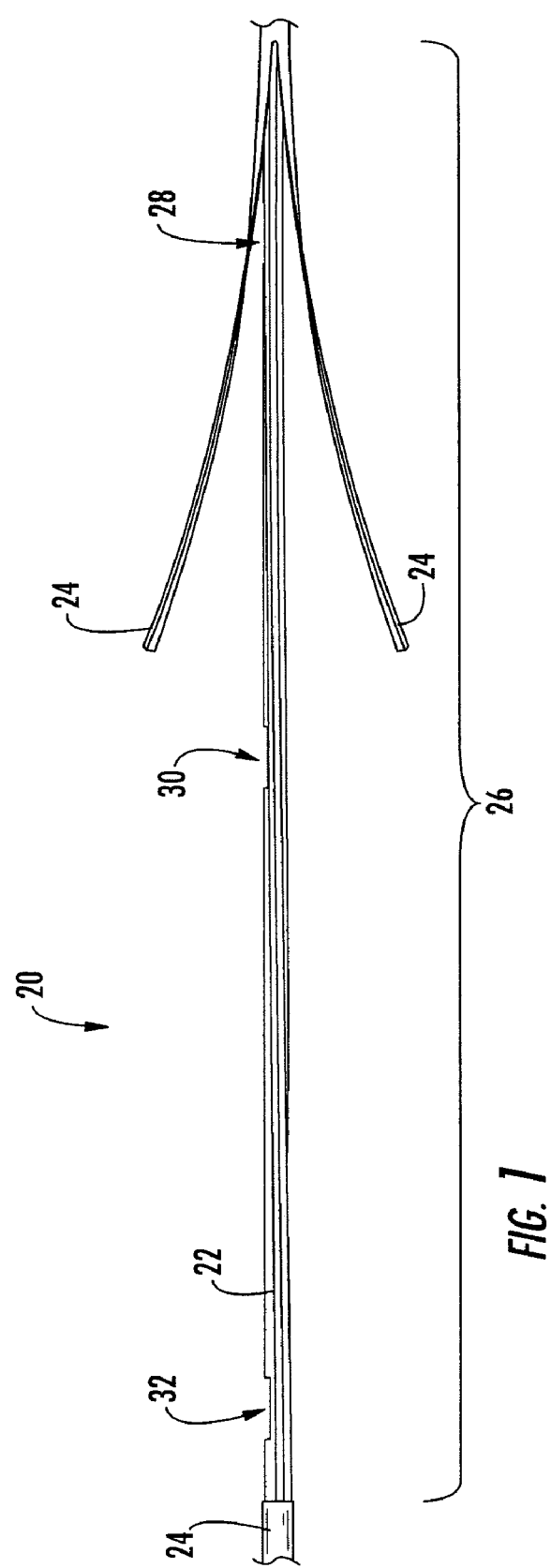
FIG. 1 is a perspective view of a fiber optic distribution cable having a predetermined access location created by removing a portion of the cable sheath and slitting and peeling back a portion of the cable sheath in order to create a plurality of access points on a buffer tube in accordance with an exemplary embodiment of the present invention.

Referring now to FIG. 1, the preterminated fiber optic distribution cable according to the present invention includes a fiber optic distribution cable 20 comprised of at least one buffer tube 22 disposed within a cable sheath 24. As is known by those skilled in the art, the distribution cable 20 as shown and described herein may include any known fiber optic cable having a fiber count greater than that of a drop cable and comprising at least one buffer tube, such as an ALTOS® dielectric cable available from Coming Cable Systems LLC of Hickory, N.C. The ALTOS® dielectric cable, for example, is a lightweight cable designed for both conduit (buried) and aerial (lashed) installations. The distribution cable 20 may be of a loose tube design that provides stable performance over a wide range of temperatures and is compatible with any telecommunications grade optical fiber.

The distribution cable 20 may comprise a water-blocking compound, such as a gel, to prevent water penetration that may lead to optical fiber damage. However, the distribution cable 20 may also be a "dry-tube" cable. In preferred embodiments, the distribution cable 20 is flexible, easy to route and has no preferential bend.

To achieve a mid-span, low profile access location, a section of the cable sheath (not shown) is severed and removed to expose the buffer tubes 22 within the distribution cable 20. The exposed length of the cable may vary. However, in a preferred embodiment, the length ranges between about 14 and 16 inches. On the downstream end of the exposed cable length, one or more longitudinally extending slits are made in the cable sheath 24. The cable sheath 24 is then peeled back, or flared, to allow for an additional length of the buffer tubes 22 to be exposed. The cable sheath 24 may be slit using a buffer tube access tool operable for slitting the cable sheath 24 longitudinally into two substantially equal halves without damaging the buffer tubes 22 disposed within the cable 20. The slit cable sheath 24 length may also vary. However, in a preferred embodiment, the slit length ranges between about 12 and 14 inches. Thus, the total amount of buffer tube 22 exposed may range between about 25 and 30 inches. As described below, the exposed buffer tube length allows for about 20–30 inches of optical fiber to be withdrawn from the buffer tube 22 for subsequent splicing, thereby providing sufficient slack fiber length for more than one splice attempt.

For a given access location 26, the appropriate buffer tube 22 may be accessed in at least two, and as shown three places, using a standard No-Slack Optical Fiber Access Tool (NOFAT) available from Coming Cable Systems LLC of Hickory, N.C. The NOFAT tool is suitable for use in locations in which a minimal amount of cable slack can be obtained and the buffer tubes 22 remain wrapped around the central member. The NOFAT tool provides a guide that allows a scalpel to slice a section of a buffer tube 22 off without cutting completely through the buffer tube 22 or the optical fibers disposed within the buffer tube 22. The NOFAT tool is compatible with standard Coming Cable Systems ALTOS® Cable buffer tube sizes.

As shown and described herein, three access locations, typically about 10–15 inches apart, are cut on the appropriate buffer tube 22. As will be readily understood by those skilled in the art, at least three access locations are specifically advantageous for removing one or more optical fibers from a buffer tube filled with a water-blocking gel. Starting at the first buffer tube access point 28, a predetermined number of 250 µm optical fibers are accessed and severed. In a buffer tube 22 comprising twelve optical fibers, for example, four or eight optical fibers may be preterminated. The remaining optical fibers disposed within the buffer tube 22 remain intact and continue through the distribution cable 20. The severed optical fibers are then fished out of the middle, or second access point 30, on the same buffer tube, exposing about 12–14 inches of fiber length. The same optical fibers are then fished out of the buffer tube 22 a second time at the third access point 32 adjacent to the upstream end of the cable sheath 24, thereby exposing a total fiber length of about 20–30 inches. The minimum bend radius of the optical fibers is not violated during the process of fishing-out the fibers. After removing the optical fibers from the buffer tube 22, any water-blocking gel (if present within the buffer tube 22) is cleaned off of the entire exposed length of the optical fibers.

Appropriate buffer tubes 22 and optical fibers may be located within the cable by color-coded markings or colored tubing used in many conventional cable designs. Access locations may be placed along a distribution cable at locations in which inflection points occur. An inflection point is a point along a cable at which the helical winding of the buffer tubes switches its winding direction, and typically occurs about every meter along the length of the cable. The inflection points along a distribution cable 20 may be marked on the cable sheath 24. The inflection points allow enough buffer tube slack to raise the buffer tube slightly and insert the NOFAT tool.

Figure 2:
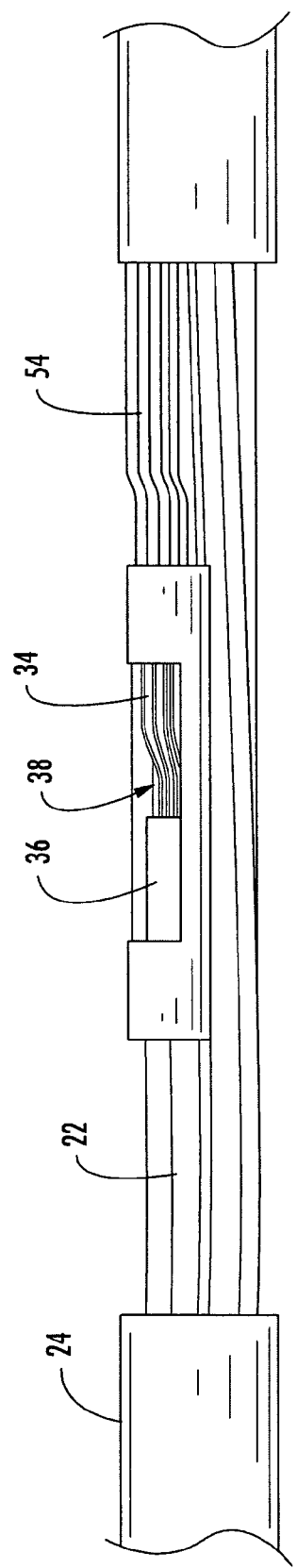
FIG. 2 is a perspective view of the preterminated fiber optic distribution cable of FIG. 1 illustrating a buffer tube transition piece and a plurality of protective tubes for receiving preterminated optical fibers in accordance with an exemplary embodiment of the present invention.

Referring to FIG. 2, once the optical fibers 34 have been withdrawn from their respective buffer tube 22, the 250 μm coated optical fibers 34 are fed through and arranged in a buffer tube transition piece 36. The buffer tube transition piece 36 may be rigid or somewhat flexible to permit the buffer tube transition piece 36 to bend slightly to conform to the curvature of the buffer tube 22 or other structure to which it is attached. The buffer tube transition piece 36 is positioned to surround the third access point and to protect the exposed open portion of the buffer tube 22. In a preferred embodiment, the buffer tube transition piece 36 is snapped over the exposed buffer tube region where the optical fibers 34 exit. Once all of the optical fibers 34 have been routed, a cavity provided in the buffer tube transition piece 36 may be filled with a sealing material, such as a silicone elastomer or epoxy material, to seal the junction, prevent torque in the transition piece 36 and prevent any water-blocking gel that may be present from leaking out of the buffer tube. Although not shown, the first and second exposed access points on the buffer tube 22 may be sealed with a heat shrinkable tape or a zippered heat shrinkable material.

Figure 3A:
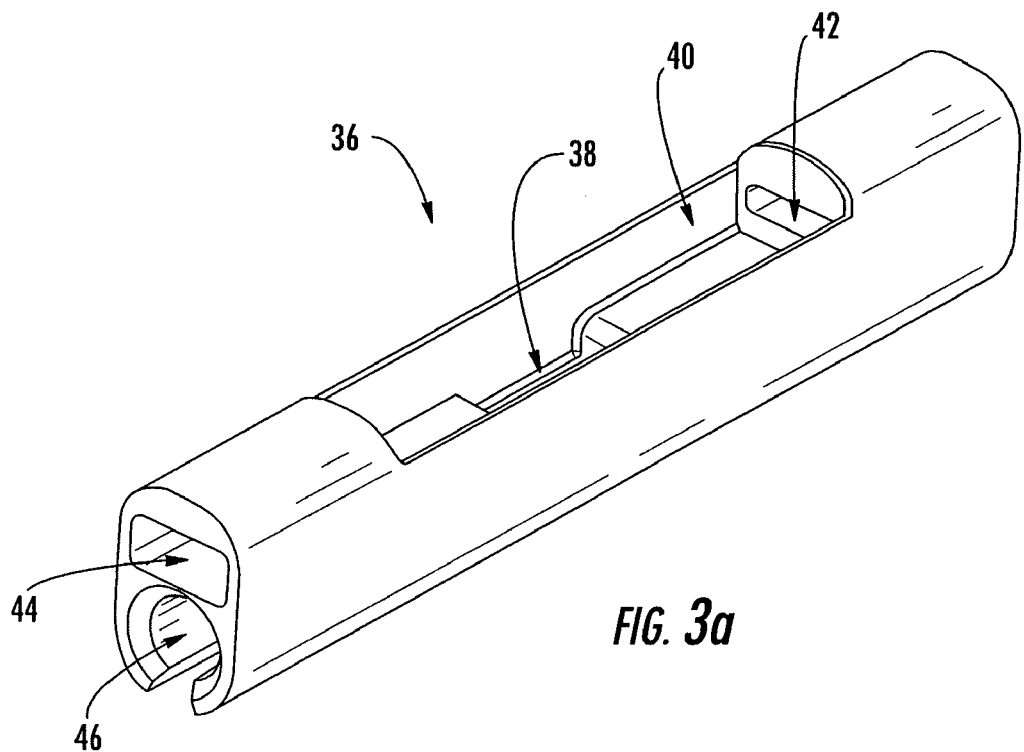
FIG. 3a is a perspective view of a universal buffer tube transition piece operable for transitioning a plurality of preterminated optical fibers from a buffer tube into corresponding protective tubes in accordance with an exemplary embodiment of the present invention.

Referring to FIG. 3a, an enlarged view of a universal buffer tube transition piece 36 operable for transitioning a plurality of preterminated optical fibers from a buffer tube 22 into one or more protective tubes is illustrated. The buffer tube transition piece 36 is a molded piece defining an optical fiber opening 38 for receiving the optical fibers exiting from the buffer tube 22. The buffer tube transition piece 36 further defines a cavity 40 for routing the optical fibers into an optical fiber slot 42. The optical fiber slot 42 is operable for maintaining the optical fibers in a linear array and securing the protective tubes, as will be discussed in greater detail below. As shown, the buffer tube transition piece 36 is specifically designed to transition either four or eight optical fibers from the buffer tube 22 into protective tubes. Optical fiber slot 42 is used in applications in which one to four optical fibers are withdrawn from a buffer tube 22. Optical fiber slot 44 may be used in applications in which five to eight optical fibers are withdrawn from the buffer tube 22.

The appropriate optical fiber slot should be positioned downstream of the origination of the optical fibers so that the optical fibers are smoothly transitioned without violating their minimum bend radius. When using optical fiber slot 44, the optical fibers may be arranged in two rows of four within the slot 44. The buffer tube transition piece 36 further defines a molded channel 46 for receiving the buffer tube 22. As shown, the channel 46 is molded into a C-shape. However, the channel 46 may have any suitable shape and may be formed in any suitable manner. As described in the previous paragraph, the buffer tube transition piece 36 is snapped over the exposed buffer tube region where the optical fibers 34 exit. A syringe tube may be used to fill the voids in the buffer tube transition piece 36 with the sealing material.

Figure 3B:
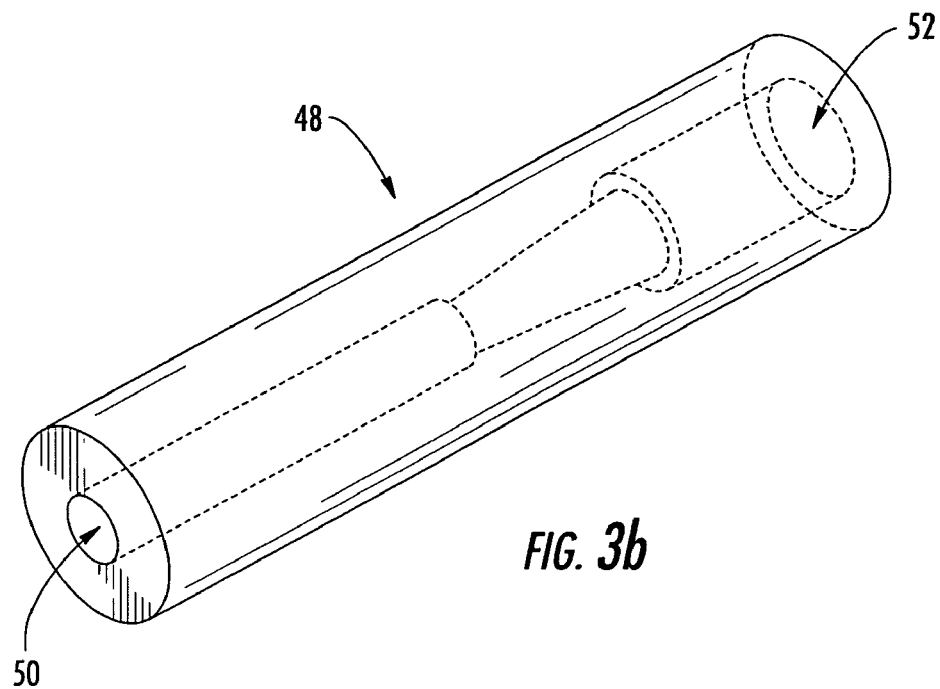
FIG. 3b is a perspective view of an existing buffer tube transition piece operable for transitioning up to about twelve optical fibers from a buffer tube into corresponding protective tubes that may be utilized with an exemplary embodiment of the present invention.

Referring to FIG. 3b, an enlarged view of a preexisting buffer tube transition piece 48 operable for transitioning twelve preterminated optical fibers from a buffer tube 22 into protective tubes is illustrated. The buffer tube transition piece 48 is a molded piece defining an optical fiber routing tube 50 for receiving and routing the optical fibers exiting from the buffer tube. The buffer tube transition piece 48 further defines a transitioning tube 52 for transitioning up to twelve optical fibers into protective tubes. In situations in which all twelve optical fibers of a buffer tube comprising twelve optical fibers are preterminated, a lengthwise section of the buffer tube 22 may be completely severed and removed. The twelve-fiber transition piece 48 may then be secured around the severed end of the buffer tube where the fibers exit. The protective tubes 54 may be secured within the transitioning tube 52 using an epoxy material.

Referring again to FIG. 2, the exposed 250 μm optical fibers 34 are shown being routed through a buffer tube transition piece 36 that houses 900 μm protective tubes 54. In preferred embodiments, the buffer tube transition piece 36 and the protective tubes 54 are assembled and secured together using an epoxy material prior to feeding the optical fibers 34 into the protective tubes 54. In one method of assembly, the optical fibers 34 are withdrawn from the appropriate buffer tube 22, routed through the optical fiber opening 38 and fed into the protective tubes 54. The buffer tube transition piece 36 is then secured to the appropriate buffer tube 22. In an alternative method of assembly, the optical fibers 34 are withdrawn from the appropriate buffer tube 22 and then routed through the optical fiber opening 38. The buffer tube transition piece 36 may then be secured to the appropriate buffer tube 22 and the optical fibers fed into the protective tubes 54.

The cable sheath 24, which was slit and flared about 12–14 inches, is repositioned and repaired using a piece of heat shrinkable material positioned over the surface of the repositioned cable sheath 24. In a preferred embodiment, the heat recoverable material is glue-lined to provide a more secure repair. The original 14–16 inch section of cable remains exposed. When the heat shrinkable material is properly positioned on the cable, heat is applied to cause the material to shrink down onto the repositioned cable sheath 24. The heat recoverable material, along with the repositioned cable sheath 24, provides further sealing and protection of the first access point at which the optical fibers were severed. Alternatively, the slit and flared portion of the cable sheath 24 may be repaired with a self-fusing or a self-amalgamating tape in a known manner.

Figure 4:
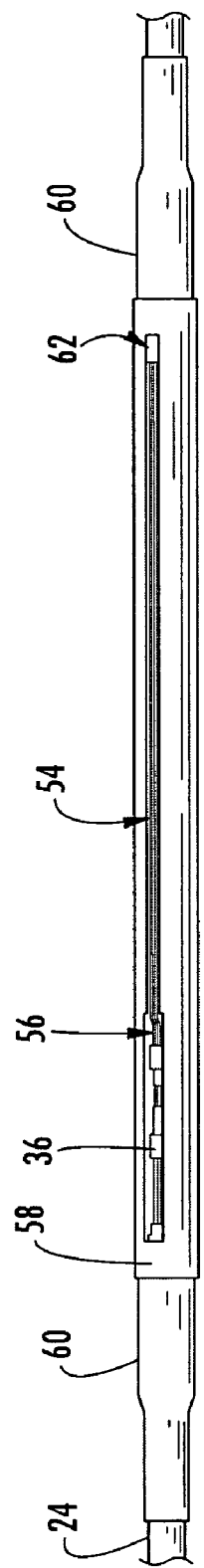
FIG. 4 is a perspective view of a preterminated fiber optic distribution cable having preterminated optical fibers disposed within a guide channel of a C-shaped molded member in accordance with an exemplary embodiment of the present invention.

Referring to FIG. 4, to protect the remaining exposed portion of the buffer tubes and provide an optical fiber guide channel, the 900 μm protective tubes 54 are routed through a guide channel opening 56 in a molded member 58. The molded member 58 is preferably C-shaped for attachment to the distribution cable 20 and made of a flexible material such that the molded member 58 flares open for installation around the cable. The buffer tube transition piece 36 is axially aligned with the guide channel opening 56. The C-shaped molded member 58 further defines an elongate optical fiber guide channel 62 operable for routing, storing and protecting the entire length of protective tubes 54 containing the preterminated optical fibers. The optical fiber guide channel 62 is also axially aligned with the buffer tube transition piece 36. In various embodiments, the C-shaped molded member 58 may have a single guide channel or multiple guide channels, and a single channel opening or multiple channel openings. The channel opening and the guide channel(s) may be straight or helical around the cable diameter. If helical, the C-shaped molded member 58 may be formed as a planar sheet and wrapped around the distribution cable 20 to obtain the helical profile. The length of the C-shaped molded member 58 may vary. However, in a preferred embodiment, the length ranges between about 25 and 40 inches.

The C-shaped molded member 58 is positioned over the entire exposed buffer tube section and held in place using a heat shrinkable material 60 positioned at both ends of the C-shaped molded member 58. The heat shrinkable material 60 is operable for securing the C-shaped molded member 58 and providing a smooth transition between the differing outer diameters of the cable sheath 24 and the C-shaped molded member 58, thus aiding installation within a conduit system. The C-shaped molded member 58 may define a flange (not shown) extending lengthwise a predetermined distance at each end of the C-shaped molded member 58, the flange operable for providing a securing point for the heat shrinkable material 60. The other end of the heat shrinkable material is shrunk onto the underlying cable sheath 24. In a preferred embodiment, the heat shrinkable material 60 may be glue-lined at both ends of the C-shaped molded member 58. Alternatively, a single length of heat shrinkable material could be utilized with or without a glue line.

Two ripcords (not shown), spaced about 180 degrees apart, may be disposed underneath the heat shrinkable material 60. The ripcords may be tied to the distribution cable at one of their ends away from the guide channel 62. Once the distribution cable is installed, the ripcords may be used to remove the heat shrinkable material 60 to expose the ends of the C-shaped molded member 58. After installation, the optical fibers are removed from the optical fiber guide channel 62 and the C-shaped molded member 58 is removed and discarded.

Figure 5:
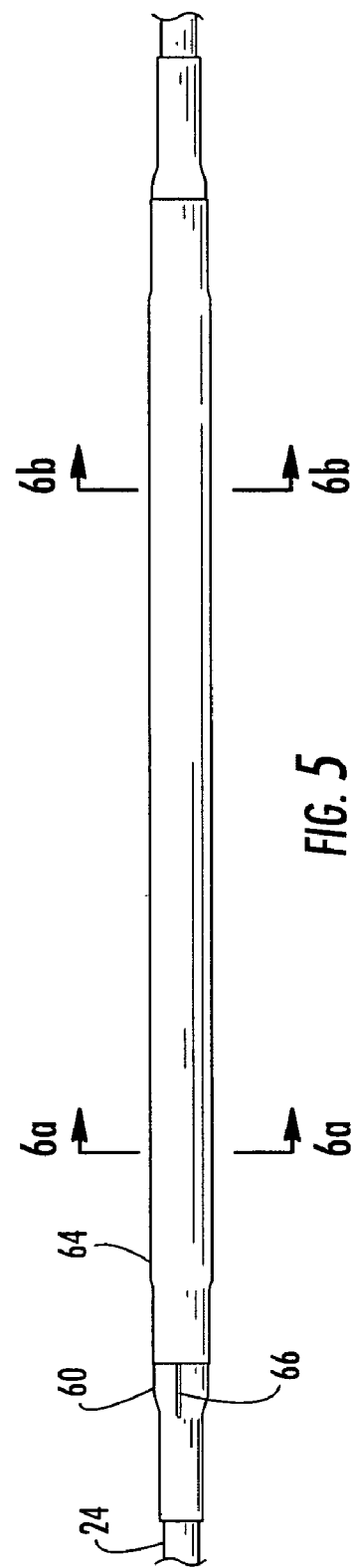
FIG. 5 is a perspective view of the preterminated distribution cable of FIG. 1 showing the access location enclosed by a protective heat shrinkable material in accordance with an exemplary embodiment of the present invention.

Referring to FIG. 5, once the C-shaped molded member has been positioned and secured, the C-shaped molded member may be covered using a Kapton® tape (not shown), a water-swellable tape (not shown) and a heat shrinkable material 64. The heat shrinkable material 64 is used to protect the exposed section of the distribution cable, the buffer tube transition piece and the optical fiber guide channel. In a preferred embodiment, a non glue-lined heat shrink is slid over the entire access location with at least two ripcords 66, spaced apart by about 180 degrees, positioned underneath. Once the access location is pulled into place, the ripcords 66 are used to remove the outer later of heat shrinkable material 64 to expose the removable C-shaped molded member 58. The heat shrinkable material 64 covering the entire access location provides protection during cable installation, both from physical forces and from the environment. In an alternative embodiment, the heat shrinkable material 64 is disposed directly on top of the C-shaped molded member 58.

In one embodiment, all heat shrinkable material may be pre-installed along the distribution cable and slid into place during assembly. The heat shrinkable material 64 provides a smooth diameter transition between the heat shrinkable material 60 used to secure the ends of the C-shaped molded member 58, and the slightly larger diameter of the access location. The smooth diameter transition aids in guiding the preterminated distribution cable through a bore or conduit. The outer diameter of the heat shrinkable material 64, and in effect the largest outer diameter of the assembled cable, is greatly reduced over conventional designs due to the fact that the optical fibers are not spliced or coiled to store slack. In addition, a closure sufficiently large enough to accommodate the minimum bend radius of the optical fibers is not needed.

Figure 6A:
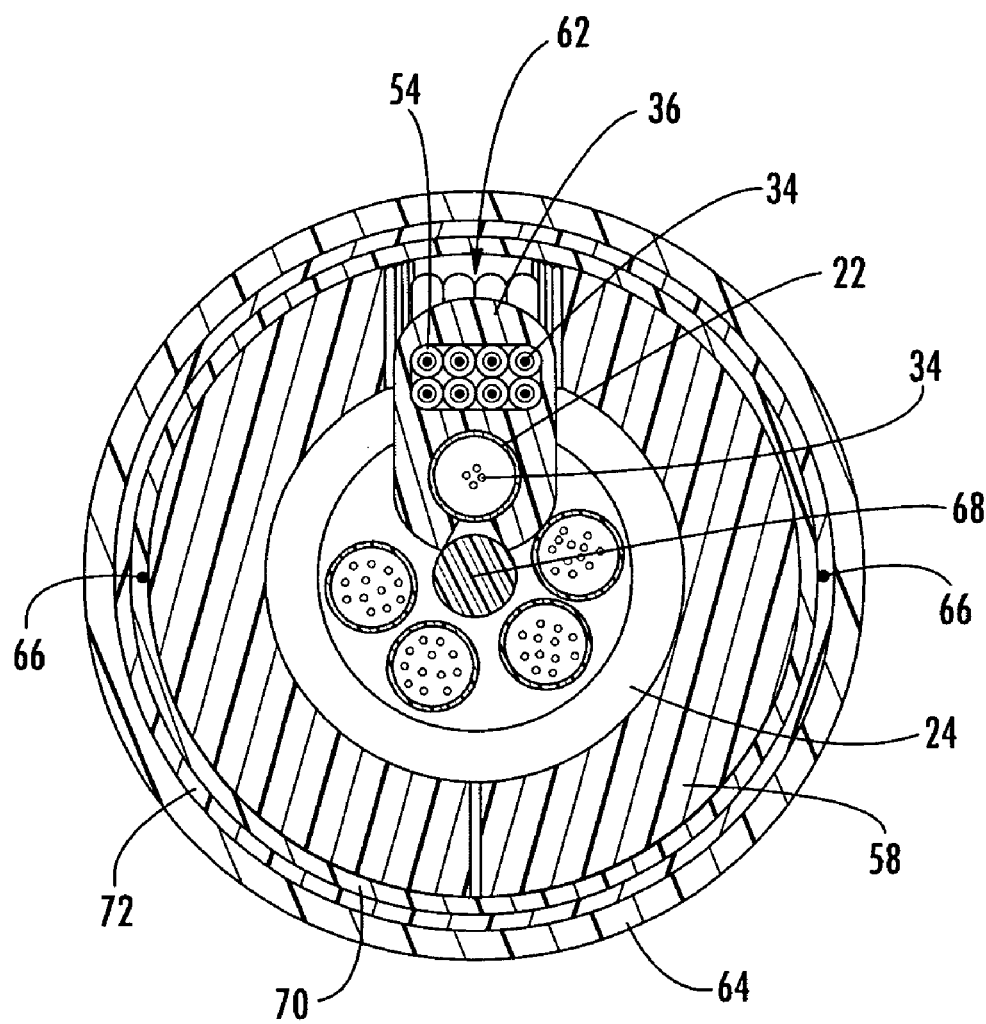
FIG. 6a is an enlarged cross-sectional view of the preterminated distribution cable of FIG. 5 taken through the buffer tube transition piece.

Referring now to FIG. 6a, an enlarged cross-sectional view of the assembled preterminated distribution cable is shown taken through the buffer tube transition piece 36. The exemplary cable shown is a 60 fiber ALTOS® cable comprising five gel-filled buffer tubes 22 with each buffer tube 22 comprising twelve optical fibers 34. The cable is a loose tube design that facilitates mid-span access in the factory. Eight optical fibers 348 from the appropriate buffer tube 22 have been preterminated and routed through the buffer tube transition piece 36. The cable further comprises a single, lengthwise extending central strength member 68 substantially centered within the plurality of buffer tubes 22. For certain cable types, a water-swellable tape and a dielectric strength member may be positioned around the plurality of buffer tubes 22, such as the ALTOS® dielectric cable available from Corning Cable Systems LLC of Hickory, N.C. Dielectric strength members have no preferential bend and require no bonding or grounding. The cable may further comprise a water-swellable yarn (not shown) helically wrapped around the central member 68 for strength.

In the example shown, eight optical fibers 34 of a twelve-fiber buffer tube are preterminated, routed through the buffer tube transition piece 36 and fed into 900 µm protective tubes 54. The remaining four optical fibers 34 within the buffer tube 22 that have not been preterminated continue through the distribution cable 20, potentially being preterminated at another access location further downstream.

The flexible C-shaped molded member 58 is flared and positioned over the plurality of buffer tubes 22 along the exposed portion of the distribution cable. An end portion of the cable sheath created as a result of a portion being removed is recessed from the cross-section point and illustrated at reference numeral 24. The C-shaped molded member 58 defines the optical fiber guide channel 62 in which the plurality of protective tubes 54 reside. As stated above, the optical fiber guide channel 62 includes a substantially longitudinally extending slot for receiving the preterminated optical fibers. To maintain an outer diameter of less than 1.9 inches, and preferably less than about 1.25 inches, slack length of the optical fiber is stored along the length of the cable, as opposed to a slack coil. The length of the guide channel 62 substantially corresponds to the length of the preterminated optical fibers 38.

To protect and maintain the preterminated optical fibers 34 within the fiber guide channel 62, the C-shaped molded member 58 may be wrapped with Kapton® tape 70. The Kapton® tape 70 substantially covers the C-shaped molded member 58 and may be helically wrapped. Conventional adhesive tape may be used to secure both ends of the Kapton® tape 70. A water-swellable tape 72 may be helically wrapped on top of the Kapton® tape 70. One example of a suitable water-blocking tape includes a 35 mm non-woven water-blocking tape (#R-14-01-03) available from Scapa Polymerics of Manchester, England. The water-blocking tape 72 is operable for preventing water ingress into the accessed distribution cable. Water penetrating the outermost heat shrinkable material 64 contacts a super absorbent powder within the tape or yarn instantly forming a water blocking gel. The gel is then held in place, preventing further damage, by the strength of the non-woven material. If a gap is encountered between the heat shrinkable material 64 and the underlying material, or between the heat shrinkable material 64 and a ripcord 66, the combination of powder, tapes and yarns fills the hole more thoroughly than traditional water-swellable materials. This prevents water vapor and high humidity from penetrating the cable even further.

As stated in the previous paragraph, the outermost layer of the assembled preterminated distribution cable is the heat shrinkable material 64. The heat shrinkable material 64 is used to seal up and protect the access location during installation. In a preferred embodiment, a non glue-lined heat shrink is slid over the entire access location with at least two ripcords 66, spaced apart by about 180 degrees, positioned underneath. Once the access location is pulled into place, the ripcords 66 are used to remove the outer later of heat shrinkable material 64, the Kapton® tape 70 and the water-swellable tape 72 to expose the removable C-shaped molded member. The exposed ends of the ripcords 66 may be tied around the distribution cable during installation.

Figure 6B:
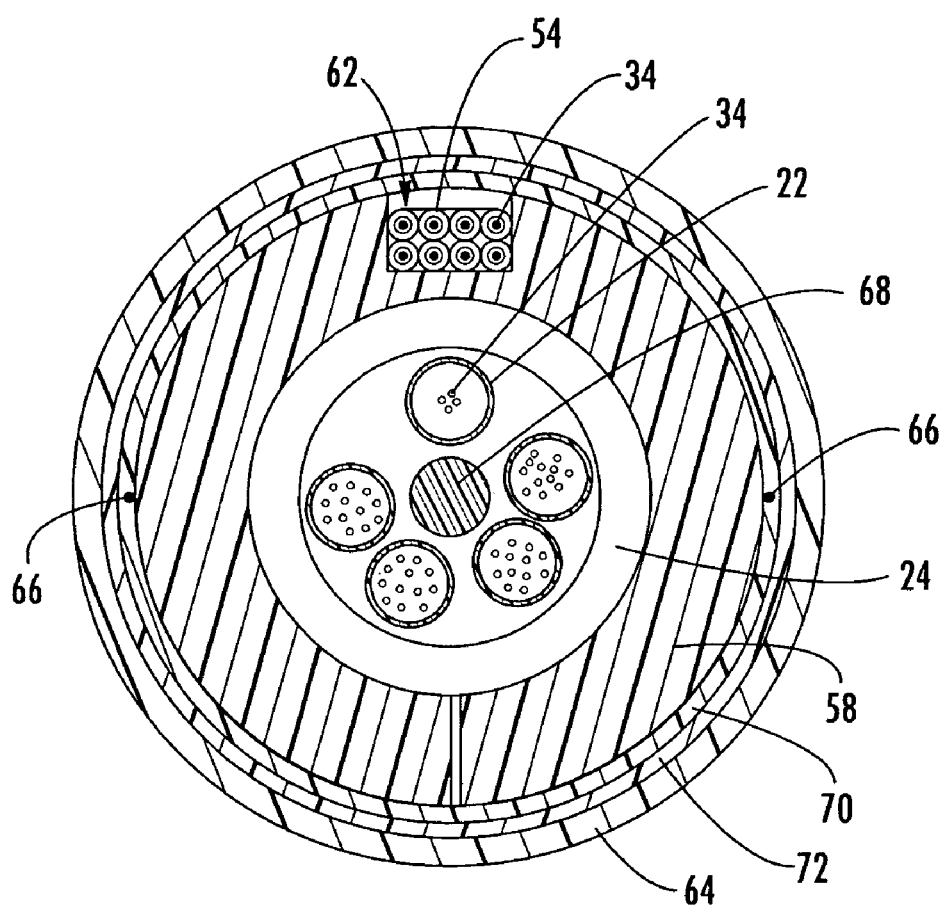
FIG. 6b is an enlarged cross-sectional view of the preterminated distribution cable of FIG. 5 taken through an optical fiber guide channel of a C-shaped molded member.

Referring to FIG. 6b, an enlarged cross-sectional view of the assembled preterminated distribution cable is shown taken through the optical fiber guide channel 62. The exemplary cable shown is the same 60 fiber ALTOS® cable shown in FIG. 6a comprising five gel-filled buffer tubes 22 with each buffer tube 22 comprising twelve optical fibers 34. Eight optical fibers 34 from the appropriate buffer tube 22 have been preterminated and are shown residing within 900 µm protective tubes 54 in two rows of four within the optical fiber guide channel 62. The remaining four optical fibers 34 within the buffer tube 22 that have not been preterminated continue through the distribution cable, potentially being preterminated at another access location further downstream.

The flexible C-shaped molded member 58 is flared and positioned over the plurality of buffer tubes 22 along the exposed portion of the distribution cable 20. The C-shaped molded member 58 defines the guide channel 62. The length of the guide channel 62 substantially corresponds to the length of the preterminated optical fibers 34. An end portion of the cable sheath created as a result of a portion being removed is recessed from the cross-section point and illustrated at reference numeral 24.

To protect and maintain the preterminated optical fibers 34 within the fiber guide channel 62, the C-shaped molded member 58 may be wrapped with Kapton® tape 70. The Kapton® tape 70 substantially covers the C-shaped molded member 58 and may be helically wrapped. Tape may be used to secure both ends of the Kapton® tape 70. A water-swellable tape 72 may be helically wrapped directly on top of the Kapton® tape 70. The outermost member of the assembled preterminated distribution cable is the heat shrinkable material 64. The heat shrinkable material 64 is used to seal up and protect the access location during installation. Ripcords 66 are used to remove the outer later of heat shrinkable material 64, the Kapton® tape 70 and the water-swellable tape 72 to expose the removable C-shaped molded member.

Figure 6C:
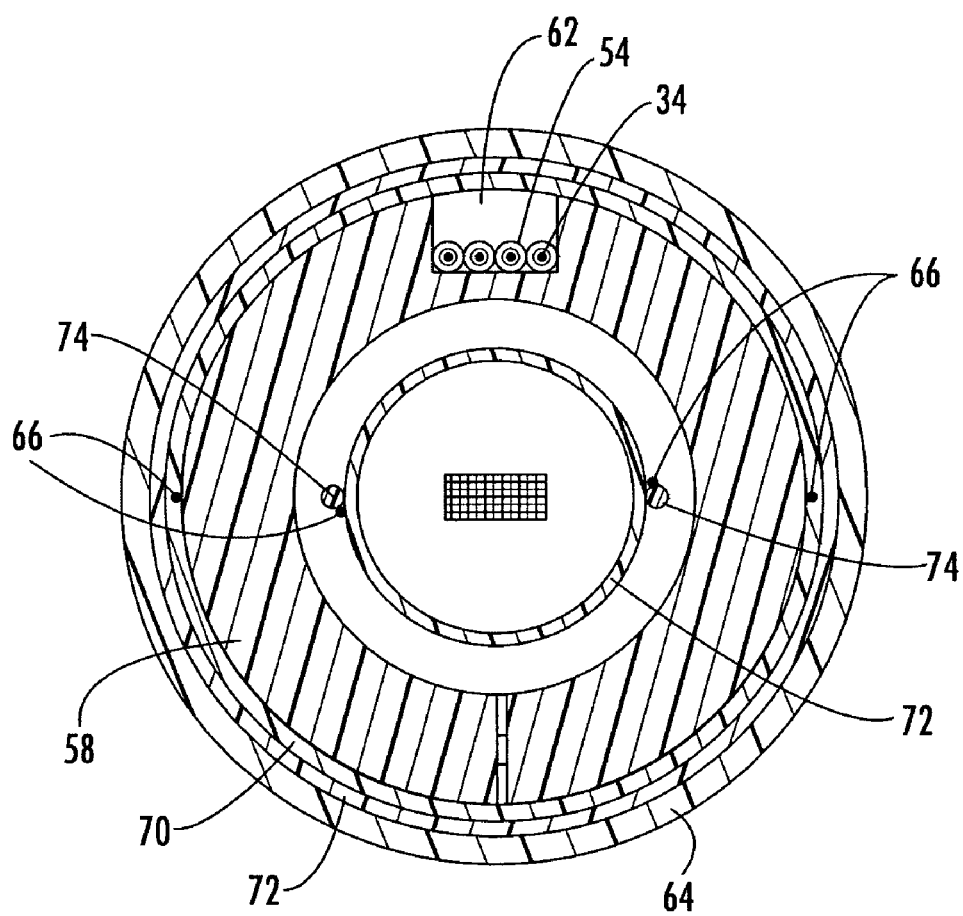
FIG. 6c is an enlarged cross-sectional view of an alternative embodiment of the preterminated distribution cable of FIG. 5 taken through the optical fiber guide channel.

Referring to FIG. 6c, an enlarged cross-sectional view of an alternative embodiment of the assembled preterminated distribution cable is shown taken through the optical fiber guide channel 62. The exemplary cable shown in FIG. 6c is a 72 fiber central tube optical fiber ribbon cable comprising a stack of five optical fiber ribbons encased within a single tube (i.e. monotube) 72 with each buffer optical fiber ribbon comprising twelve optical fibers 34. Four optical fibers 34 from an appropriate optical fiber ribbon have been preterminated and are shown residing within 900µm protective tubes 54 in one row of four individual fibers witbin the optical fiber guide channel 62. The remaining optical fibers 34 within the tube 72 that have not been preterminated continue through the distribution cable, potentially being preterminated at another access location further downstream. The ceniral strength member 68 of the previous embodiment is replaced by a pair of diametrically opposed strength members 74. The fiber guide channel 62, the ripcords 66 and the remaining components of the assembly are essentially as previously described.

The present invention provides a pre-prepped, low profile tap point that offers protection of preterminated optical fibers during cable installation and is removable once installed. The primary advantages of the assembly are size, less than 1.9 inches, and preferably less than about 1.25 inches in diameter, and the fact that the optical fibers have already been accessed and are ready for splicing in the field. The preterminated optical fibers may be fusion spliced to pigtails with connectors and added to adapters in a closure wall, or may be fusion spliced directly to drop cables, as would be readily understood by those skilled in the art. A conventional enclosure may be used to seal the access location after the cable has been installed, the heat shrinkable materials removed, the C-shaped molded member removed, and the optical fibers spliced. The buffer tube transition piece and the protective tubes secured to the transition piece remain attached to the appropriate buffer tube. The preterminated fiber optic distribution cable and all of its components have a degree of flexibility sufficient for the cable to be installed within a bore or conduit. More importantly, because the preterminated optical fibers are not spliced in the factory, a profile of less than about 1.25 inches can be achieved, making it possible to install the cable within small diameter, buried conduits.

Figure 7:
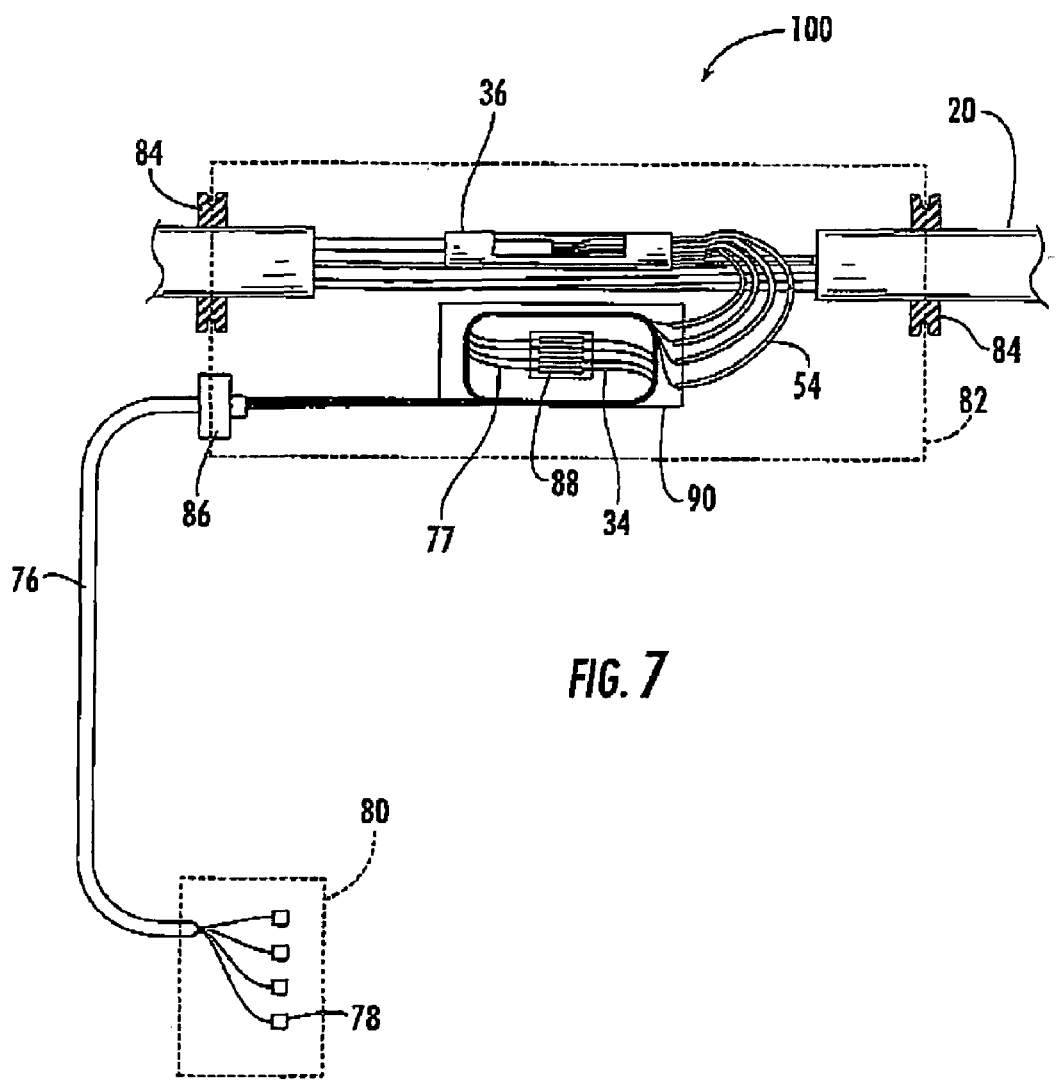
FIG. 7 illustrates a fiber optic distribution cable according to the present invention installed within a conventional fiber optic communications network.

FIG. 7 illustrates a fiber optic distribution cable 20 according to the invention installed within a conventional fiber optic communications network 100. In particular, the optical fibers 34 accessed at one of the predetermined access locations along the fiber optic distribution cable 20 are routed out of the buffer tube transition piece 36 trough the corresponding protective tubes 54 into a splice tray 90 within a conventional splice closure 82. The optical fibers 34 are spliced in a known manner with splices 88 to respective optical fibers 77 of a drop cable 76. The closure is provided with a pair of through ports 84 for sealingly receiving the distribution cable 20 and an exit port 86 for sealingly receiving the drop cable 76. Preferably, the drop cable 76 is pre-connectorized and comprises conventional single or multiple fiber connectors 78 for connecting the accessed optical fibers 34 of the distribution cable 20 (via optical fibers 77 of drop cable 76) to respective optical fibers of the communications network within a conventional outside plant closure 80, such as a local convergence cabinet (LCC), a pedestal, a network access point (NAP), or a network interface device (Nil)) of the types available from Coming Cable Systems LLC of Hickory, N.C.

The foregoing is a description of various embodiments of the invention that are provided here by way of example only. Although the preterminated fiber optic distribution cable and method of assembly have been described with reference to preferred embodiments and examples thereof, other embodiments and examples may perform similar functions and/or achieve similar results. All such equivalent embodiments and examples are within the spirit and scope of the present invention and are intended to be covered by the appended claims.

That which is claimed is:

1. A preterminated fiber optic distribution cable having at least one access location for providing access to at least one preterminated optical fiber, comprising:
    at least one buffer tube comprising at least one optical fiber;
    a buffer tube transition piece operable for transitioning the at least one optical fiber from the at least one buffer tube into at least one protective tube;

a molded member defining a longitudinally extending optical fiber guide channel operable for storing a length of the at least one preterminated optical fiber; and a protective means operable for protecting the at least one buffer tube, the buffer tube transition piece and the molded member during installation of the preterminated fiber optic distribution cable.

2. The preterminated distribution cable of claim 1, wherein an outer diameter of the preterminated distribution cable is less than 1.9 inches.

3. The preterminated distribution cable of claim 1, wherein an outer diameter of the preterminated distribution cable is less than about 1.25 inches.

4. The preterminated distribution cable of claim 1, wherein the preterminated distribution cable, the at least one buffer tube, the buffer tube transition piece and the molded member are sufficiently flexible to permit the fiber optic distribution cable to be installed through a small diameter conduit.

5. The preterminated distribution cable of claim 1, wherein the optical fiber guide channel is axially aligned with the buffer tube transition piece.

6. The preterminated distribution cable of claim 1, wherein a length of the optical fiber guide channel ranges from about 20 to about 30 inches.

7. The preterminated distribution cable of claim 1, wherein the protective means comprises a heat shrinkable material operable for securing the molded member and for providing a smooth transition between an outer diameter of a cable sheath and the molded member.

8. The preterminated distribution cable of claim 1, further comprising at Least one ripcord disposed underneath the protective means operable for removing the protective means after cable installation in order to expose the molded member.

9. The preterminated distribution cable of claim 1, further comprising a water-swellable tape disposed between the protective means and the molded member.

* * * * *